3,763,169
ISONIPECOTIC ACID COMPOUNDS
Charles Malen, Fresnes, and Xavier Pascaud, Paris, France, assignors to Science Union et Cie., Suresnes, France
No Drawing. Filed Nov. 22, 1971, Ser. No. 203,101
Claims priority, application Great Britain, Dec. 2, 1970, 57,260/70
Int. Cl. C07d 67/00
U.S. Cl. 260—293.57                4 Claims

ABSTRACT OF THE DISCLOSURE

Isonipecotic acid compounds of the formula:

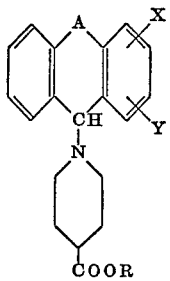

wherein A is —CH$_2$—CH$_2$—, —CH=CH—, —CH$_2$—S— or —CH$_2$—O—

X and Y are hydrogen, halogen or lower alkoxy, and R is hydrogen or lower alkyl.

These compounds possess gastric antisecretory and antiulcer properties.

---

The present invention provides isonipecotic acid compounds of the general Formula I:

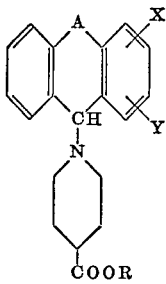

wherein:

A is a radical selected from the group consisting of: —CH$_2$—CH$_2$—, —CH=CH—, —CH$_2$—S— and —CH$_2$—O—;

X and Y, which are the same or different, are selected from the group consisting of a hydrogen atom, a halogen atom, and a lower alkoxy radical containing from 1 to 5 carbon atoms inclusive; and R is selected from the group consisting of a hydrogen atom and a lower alkyl radical containing from 1 to 5 carbon atoms inclusive.

In the meaning of X and Y, illustrative halogen atoms are chlorine, fluorine, and bromine, and illustrative alkoxy radicals are methoxy, ethoxy, propoxy, isopropoxy, butoxy, sec-butoxy, tert-butoxy and the pentyloxy.

In the meaning of R, illustrative alkyl radicals are methyl, ethyl, propyl, isopropyl, butyl, isobutyl, sec-butyl, tert-butyl and the pentyls.

The compounds of the general Formula I are new and are prepared according to a process which comprise condensing a halo compound of the general Formula II

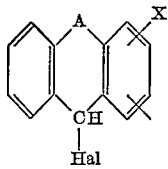

wherein A, X and Y have the meanings given above and Hal represents a chlorine or bromine atom, with an alkyl isonipecotate of the general Formula III:

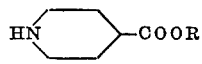

wherein R represents a lower alkyl radical containing from 1 to 5 carbon atoms inclusive, in order to obtain a compound of the general Formula I wherein R represents a lower alkyl radical, then hydrolysing this resulting ester, advantageously in an aqueous-alcoholic medium, in order to obtain the corresponding compound of the general Formula I wherein R represents a hydrogen atom.

The condensation of the Compounds II and III is preferably carried out in a suitable organic solvent, for example nitromethane, acetonitrile or dimethylformamide.

The compounds of the general Formula I wherein R represents a hydrogen atom yield addition salts with inorganic bases such as bases of alkali or alkaline earth metals, for example sodium, potassium or calcium hydroxide, carbonate or bicarbonate and with organic bases.

The compounds of the general Formula I wherein X and Y do not both represent a hydrogen atom and/or wherein A is an asymmetric bridge may exist in the form of optical isomers and, although in this specification reference is made to the single Formula I, it is to be understood that, where they exist, all the optical isomers are included within the scope of the present invention.

The compounds of the general Formula I wherein R is a lower alkyl radical are crystalline white products, each having a well defined melting point. The compounds of the general Formula I wherein R is a hydrogen atom are generally solid products, the melting points of which are in fact decomposition points, so their determination is rather imprecise.

The following examples illustrate the invention, the melting points being determined in a Kofler block.

EXAMPLE 1

N-[2,3-dimethoxy-dibenzo (a,d) cycloheptadien-5-yl] isonipecotic acid

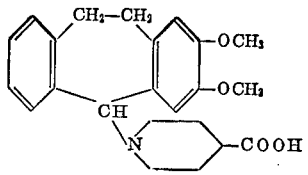

48 g. (0.165 mole) of 2,3-dimethoxy-5-chloro-dibenzo (a,d) cycloheptadiene in 450 ml. of nitromethane were poured, at once, in a solution of 52 g. (0.330 mole) of ethyl isonipecotate in 50 ml. of nitromethane. The reaction was slightly exothermic, and the mixture was heated at 60° C., on the waterbath, for one hour. The solvent was evaporated under vacuum, then the residue was taken up in chloroform and water. The organic phase was decanted off, washed to neutrality, dried over sodium sulphate, and evaporated under vacuum.

64.7 g. of crude product were obtained, and after recrystallization from anhydrous ethanol there were obtained 60 g. of ethyl N-[2,3-dimethoxydibenzo (a,d) cycloheptadien-5-yl] isonipecotate, melting at 108–110° C.

64 g. (0.156 mole) of this ester were treated with 165 ml. of a normal aqueous solution of sodium hydroxide and 150 ml. of ethanol. The mixture was refluxed for 30 minutes and ethanol then evaporated under vacuum. The residual aqueous phase was acidified with acetic acid, then left to stand overnight at 0° C The so-obtained organic acid was suctioned off and dried over phosphoric anhydride and potassium hydroxide under vacuum. There were obtained 53 g. of crude acid, which recrystallized from methanol and oven-dried at 105° C. under vacuum, yield 34.8 g. of N-[2,3-dimethoxy-dibenzo (a,d) cycloheptadien-5-yl] isonipecotic acid, melting at 140° C., with decomposition.

In a similar manner using ethyl isonipecotate and in place of 2,3-dimethoxy-5-chloro-dibenzo (a,d) cycloheptadiene:

2,3-diethoxy-5-chloro-dibenzo (a,d) cycloheptadiene,
2,3-dipropoxy-5-chloro-dibenzo (a,d) cycloheptadiene,
2,3-dibutoxy-5-chloro-dibenzo (a,d) cycloheptadiene,
2,3-dipentyloxy-5-chloro-dibenzo (a,d) cycloheptadiene,
2,3,5 trichloro-dibenzo (a,d) cycloheptadiene,
2,3-difluoro-5-chloro-dibenzo (a,d) cycloheptadiene, and
2,3-dbromo-5-chloro-dibenzo (a,d) cycloheptadiene, there were respectively obtained N-[2,3-diethoxy-dibenzo (a,d) cycloheptadiene-5-yl] isonipecotic-acid,
N-[2,3-dipropoxy-dibenzo (a,d) cycloheptadien-5-yl] isonipectotic-acid,
N-[2,3-dibutoxy-dibenzo (a,d) cycloheptadien-5-yl] isonipecotic-acid,
N-[2,3-dipentyloxy-dibenzo (a,d) cycloheptadien-5-yl] isonipecotic-acid,
N-[2,3-dichloro-dibenzo (a,d) cycloheptadien-5-yl] isonipecotic-acid,
N-[2,3-difluoro-dibenzo (a,d) cycloheptadien-5-yl] isonipecotic-acid, and
N-[2,3-dibromo-dibenzo (a,d) cycloheptadien-5-yl] isonipecotic-acid.

EXAMPLES 2–6

The following compounds were prepared according to the method described in Example 1.

(2) N-[2-methoxy-dibenzo (a,d) cycloheptadien-5-yl] isonipecotic acid, M.P. 190° C. with decomposition starting from 2-methoxy-5-chloro-dibenzo (a,d) cycloheptadiene and ethyl isonipecotate.

In a similar manner, using ethyl isonipecotate and 2-ethoxy-5-chloro-dibenzo (a,d) cycloheptadiene, 2-propoxy-5-chloro-dibenzo (a,d) cycloheptadiene, 2-butoxy-5-chloro-dibenzo (a,d) cycloheptadiene, 2-pentyloxy-5-chloro-dibenzo (a,d) cycloheptadiene, 2,5-dichloro-dibenzo (a,d) cycloheptadiene, 2-fluoro-5-chloro-dibenzo (a,d) cycloheptadiene and 2-bromo-5-chloro-dibenzo (a,d) cycloheptadiene, there were respectively obtained N-[2-ethoxy-dibenzo (a,d) cycloheptadien-5-yl] isonipecotic acid,
N-[2-propoxy-dibenzo (a,d) cycloheptadien-5-yl] isonipecotic acid,
N-[2-butoxy-dibenzo (a,d) cycloheptadien-5-yl] isonipecotic acid,
N-[2-pentyloxy-dibenzo (a,d) cycloheptadien-5-yl] isonipecotic acid,
N-[2-chloro-dibenzo (a,d) cycloheptadien-5-yl] isonipecotic acid,
N-[2-fluoro-dibenzo (a,d) cycloheptadien-5-yl] isonipecotic acid, and
N-[2-bromo-dibenzo (a,d) cycloheptadien-5-yl] isonipecotic acid.

(3 Sodium N-[dibenzo (a,d) cycloheptadiene-5-yl] isonipecotate, crystallized with 1,5 H₂O, starting from 5-chloro-dibenzo (a,d) cycloheptadiene and ethyl isonipecotate.

(4) N-[dibenzo (a,d) cycloheptatrien-5-yl] isoinpecotic acid, M.P. 167° C., M.P. of the corresponding ethyl isonipecotate 84–85° C., starting from 5-chloro-dibenzo (a,d) cycloheptartriene and ethyl isonipecotate.

In a similar manner, ethyl isonipecotate was reacted with 2-methoxy-5-chloro dibenzo (a,d) cycloheptatriene,
2-ethoxy-5-chloro dibenzo (a,d) cycloheptatriene,
2-propoxy-5-chloro dibenzo (a,d) cycloheptatriene,
2-butoxy-5-chloro dibenzo (a,d) cycloheptatriene,
2-pentyloxy-5-chloro dibenzo (a,d) cycloheptatriene,
2,5-dichloro dibenzo (a,d) cycloheptatriene,
2-fluoro-5-chloro dibenzo (a,d) cycloheptatriene, and
2-bromo-5-chloro dibenzo (a,d) cycloheptatriene, to give respectively, N-[2-methoxy-dibenzo (a,d) cycloheptatrien-5-yl] isonipecotic acid,
N-[2-ethoxy-dibenzo (a,d) cycloheptatrien-5-yl] isonipecotic acid,
N-[2-propoxy-dibenzo (a,d) cycloheptatrien-5-yl] isonipecotic acid,
N-[2-butoxy-dibenzo (a,d) cycloheptatrien-5-yl] isonipecotic acid,
N-[2-pentyloxy-dibenzo (a,d) cycloheptatrien-5-yl] isonipecotic acid,
N-[2-chloro-dibenzo (a,d) cycloheptatrien-5-yl] isonipecotic acid,
N-[2-fluoro-dibenzo (a,d) cycloheptatrien-5-yl] isonipecotic acid, and
N-[2-bromo-dibenzo (a,d) cycloheptatrien-5-yl] isonipecotic acid, (5) N - [2,3 - dimethoxy-dibenzo (b,e) thiepin-11-yl] isonipecotic acid, M.P. 170° C. with decomposition, M.P. of the corresponding ethyl isonipecotate: 128–130° C., starting from 2,3-dimethoxy 11-chloro-dibenzo (b,e) thiepine and ethyl isonipecotate.

(6) N - [3 - chloro-dibenzo (b,e) thiepin-11-yl) isonipecotic acid, M.P. 190° C. with decomposition, starting from 3,11-dichloro-dibenzo (b,e) thiepine and ethyl isonipecotate.

In a similar manner, ethyl isonipecotate was reacted with 3-methoxy-11-chloro-dibenzo (b,e) thiepine,
3-ethoxy-11-chloro-dibenzo (b,e) thiepine,
3-propoxy-11-chloro-dibenzo (b,e) thiepine,
3-butoxy-11-chloro-dibenzo (b,e) thiepine,
3-pentyloxy-11-chloro-dibenzo (b,e) thiepine,
3-fluoro-11-chloro-dibenzo (b,e) thiepine,
3-bromo-11-chloro-dibenzo (b,e) thiepine, and
11-chloro-dibenzo (b,e) thiepine to give, respectively, N-[3-methoxy-dibenzo (b,e) thiepin-11-yl] isonipecotic acid,
N-[3-ethoxy-dibenzo (b,e) thiepin-11-yl] isonipecotic acid,
N-[3-propoxy-dibenzo (b,e) thiepin-11-yl] isonipecotic acid,
N-[3-butoxy-dibenzo (b,e) thiepin-11-yl] isonipecotic acid,
N- 3-pentyloxy-dibenzo (b,e) thiepin-11-yl] isonipecotic acid,
N-[3-fluoro-dibenzo (b,e) thiepin-11-yl] isonipecotic acid,
N-[3-bromo-dibenzo (b,e) thiepin-11-yl] isonipecotic acid, and
N-[dibenzo (b,e) thiepin-11-yl] isonipecotic acid.

Using ethyl isonipecotate and, in place of 11-chloro dibenzo (b,e) thiepine,
11-chloro-dibenzo (b,e) oxepine,
3-lower alkoxy-11-chloro-dibenzo (b,e) oxepine,
2,3-di(lower alkoxy)-11-chloro dibenzo (b,e) oxepine,
3-halo-11-chloro-dibenzo (b,e) oxepine, and
2,3-dihalo-11-chloro-dibenzo (b,e) oxepine, there were respectively obtained N-[dibenzo (b,e) oxepin-11-yl] isonipecotic acid,
N-[3-lower alkoxy-dibenzo (b,e) oxepin-11-yl] isonipecotic acid,
N-[2,3-di-(lower alkoxy)-dibenzo (b,e) oxepin-11-yl] isonipecotic acid,
N-[3-halo-dibenzo (b,e) oxepin-11-yl] isonipecotic acid, and
N-[2,3-halo-dibenzo (b,e) oxepin-11-yl] isonipecotic acid.

The compounds of the general Formula I and physiologically tolerable salts thereof possess valuable pharmacological and therapeutic properties, especially gastric antisecretory and antiucler properties.

Their toxicity is weak and the $LD_{50}$ in mice varies from 250 to 500 mg./kg. by intraperitoneal route and from 630 to > 1000 mg./kg. by intraperitoneal route and from The activity of the new compounds on the gastric secretion was demonstrated by the method of Shay H. et al. (Gastroent. 5, 43, 1945). A 50% decrease of the volume and of the acidity of the secretion was observed with 10 to 50 mg./kg. of the compounds administered by intraduodenal or by intraperitoneal route.

The compounds of the invention exhibit a very important protecting activity against the restraint ulcer and the ulcer provoked by phenylbutazone. The $ED_{50}$ is between 44 and 150 mg./kg. by oral or I.P. administration.

The low toxicity and the above described pharmacological properties enable the use of the new compounds in therapy and especially in the treatment of gastroduodenal ulcers and gastric hypersecretion.

The present invention also provides pharmaceutical compositions comprising a compound of general Formula I or a physiologically tolerable salt thereof, in admixture or conjunction with a pharmaceutically suitable carrier. The compositions may be administered by oral, rectal or parenteral route. The suitable pharmaceutical carriers are, for example, distilled water, starch, talc, glucose, lactose, or cocoa butter in order to obtain the suitable pharmaceutical forms such as, for example, tablets, dragées, capsules, suppositories or solutions.

The doses of active ingredient may vary from 50 to 500 mg., preferably 100 to 300 mg., 1 to 5 times in a day.

We claim:

1. A compound selected from the group consisting of
(A) Isonipecotic acid compounds of the general formula:

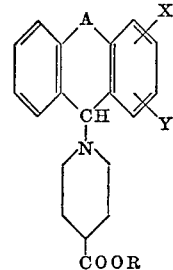

wherein:
A is a radical selected from the group consisting of: $-CH_2-CH_2-$, $-CH=CH-$, $-CH_2-S-$ and $-CH_2O-$;
X and Y are selected from the group consisting of hydrogen, halogen and lower alkoxy having from 1 to 5 carbon atoms inclusive; and
R is hydrogen; and
(B) physiologically tolerable additional salts with suitable bases when R is hydrogen.

2. A compound of claim 1 which is N-[2,3-dimethoxy-dibenzo (a,d) cycloheptadien-5-yl] isonipecotic acid.

3. A compound of claim 1 which is N-[dibenzo (a,d) cycloheptatrien-5-yl] isonipecotic acid.

4. A compound of claim 1 which is N-[3-chloro-dibenzo (b,e) thiepin-11-yl] isonipecotic acid.

References Cited
UNITED STATES PATENTS 3,252,984  5/1966  Cusic et al. _____ 260—293.4

HENRY R. JILES, Primary Examiner

G. T. TODD, Assistant Examiner

U.S. Cl. X.R.

260—293.58, 293.62; 424—267